US010645559B2

(12) United States Patent
Li et al.

(10) Patent No.: US 10,645,559 B2
(45) Date of Patent: May 5, 2020

(54) BLUETOOTH CONNECTION METHOD AND TERMINAL

(71) Applicant: HUAWEI TECHNOLOGIES CO., LTD., Shenzhen (CN)

(72) Inventors: Jiaxin Li, Shanghai (CN); Peng Zhao, Xi'an (CN); Feng Chen, Xi'an (CN); Yuanlei Sun, Shanghai (CN); Xiyu Zhou, Shanghai (CN); Jian Chen, Shanghai (CN); Jun Yang, Shenzhen (CN); Ya Zhang, Shanghai (CN); Bingjian Du, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/313,462

(22) PCT Filed: Jun. 27, 2016

(86) PCT No.: PCT/CN2016/087324
§ 371 (c)(1),
(2) Date: Dec. 27, 2018

(87) PCT Pub. No.: WO2018/000134
PCT Pub. Date: Jan. 4, 2018

(65) Prior Publication Data
US 2019/0253857 A1 Aug. 15, 2019

(51) Int. Cl.
H04W 4/80 (2018.01)
H04W 76/10 (2018.01)
(Continued)

(52) U.S. Cl.
CPC ........... *H04W 4/80* (2018.02); *H04W 12/003* (2019.01); *H04W 52/028* (2013.01);
(Continued)

(58) Field of Classification Search
CPC ......... H04W 8/00; H04W 76/02; H04W 4/80; H04W 12/00; H04W 12/001;
(Continued)

(56) References Cited

U.S. PATENT DOCUMENTS

| 2014/0018002 | A1 | 1/2014 | Jose et al. |
| 2014/0073244 | A1 | 3/2014 | Ko et al. |
| 2014/0273858 | A1* | 9/2014 | Panther ............... A61B 5/0002 455/41.2 |
| 2014/0323048 | A1 | 10/2014 | Kang et al. |
| 2014/0342670 | A1 | 11/2014 | Kang et al. |
| 2017/0223615 | A1 | 8/2017 | Lee et al. |

(Continued)

FOREIGN PATENT DOCUMENTS

| CN | 104527567 A | 4/2015 |
| CN | 104620514 A | 5/2015 |

(Continued)

Primary Examiner — Blane J Jackson
(74) Attorney, Agent, or Firm — Kilpatrick Townsend & Stockton LLP

(57) ABSTRACT

Embodiments of the present invention provide a Bluetooth connection method, including: sending, by a first terminal, a Bluetooth low energy BLE advertising message, where the BLE advertising message includes device information; receiving, by a second terminal, the BLE advertising message; obtaining, by the second terminal, the device information; matching, by the second terminal, the device information with prestored device information; if the device information successfully matches the prestored device information, initiating, by the second terminal, a classic Bluetooth connection request to the first terminal; and establishing, by the first terminal, a classic Bluetooth connection to the second terminal. Power consumption of BLE is low.

7 Claims, 6 Drawing Sheets

(51) Int. Cl.
  *H04W 12/00*    (2009.01)
  *H04B 17/30*    (2015.01)
  *H04W 52/02*    (2009.01)
  *H04B 17/318*   (2015.01)

(52) U.S. Cl.
  CPC ... *H04W 52/0209* (2013.01); *H04W 52/0229* (2013.01); *H04W 76/10* (2018.02); *H04B 17/318* (2015.01); *Y02D 70/10* (2018.01); *Y02D 70/14* (2018.01); *Y02D 70/20* (2018.01)

(58) Field of Classification Search
  CPC . H04W 52/02; H04W 52/0209; H04W 76/10; H04B 17/30; H04B 17/318
  See application file for complete search history.

(56) References Cited

U.S. PATENT DOCUMENTS

| | | |
|---|---|---|
| 2017/0280277 A1 | 9/2017 | Ge et al. |
| 2017/0289787 A1* | 10/2017 | Yu .................. H04W 76/14 |
| 2017/0303326 A1 | 10/2017 | Kwon et al. |
| 2018/0103338 A1 | 4/2018 | Lu et al. |

FOREIGN PATENT DOCUMENTS

| | | |
|---|---|---|
| CN | 104967971 A | 10/2015 |
| CN | 105144757 A | 12/2015 |
| CN | 105191172 A | 12/2015 |
| CN | 105450268 A | 3/2016 |
| CN | 105516896 A | 4/2016 |
| WO | 2016017909 A1 | 2/2016 |
| WO | 2016036139 A2 | 3/2016 |

\* cited by examiner

BLUETOOTH CONNECTION METHOD AND TERMINAL

CROSS-REFERENCE TO RELATED APPLICATIONS

This application is a national stage of International Application No. PCT/CN2016/087324, filed on Jun. 27, 2016, which is hereby incorporated by reference in its entirety.

TECHNICAL FIELD

The present invention relates to the field of communications technologies, and in particular, to a Bluetooth connection method and a terminal.

BACKGROUND

With development of terminals such as a wearable device, there are more technologies for a wireless communication connection between terminals. Correspondingly, wireless short-range communications technologies, such as a wireless fidelity (Wireless-Fidelity, Wi-Fi or WiFi) technology, a Bluetooth technology, and a ZigBee technology are well developed.

The wearable device becomes popular because of portability, convenience, appearance variety, and the like. A user may have one or more other terminals such as a smart band and a smartwatch in addition to a necessary mobile phone. Different terminals of a same user may be connected and transmit data by using a Bluetooth technology.

With development of the Bluetooth technology, most of current terminals may support dual-mode Bluetooth. The dual-mode Bluetooth supports two Bluetooth protocols: Bluetooth low energy (Bluetooth Low energy, BLE) and classic Bluetooth (Classic Bluetooth). For example, the dual-mode Bluetooth is integrated in the current Bluetooth protocol 4.0.

Currently, a mobile phone may be connected to a wearable device such as a smartwatch by using the classic Bluetooth. A user may synchronize information on the mobile phone to the watch by using the Bluetooth, to answer and make a call, receive and reply to an SMS message and an instant message, and the like. However, if a Bluetooth connection between the mobile phone and the watch is released, the synchronization cannot be implemented. When the Bluetooth connection between the mobile phone and the watch is released, user experience is inevitably affected to some extent if the watch or the mobile phone does not make an attempt at an automatic reconnection. However, if the watch keeps attempting to reconnect to the mobile phone, and the mobile phone is not within a connectable range for a relatively long time, heavy power consumption is inevitably caused, and this is a challenge to a battery life of an intelligent terminal. Therefore, after the Bluetooth connection between the watch and the mobile phone is released, how to implement an automatic reconnection without affecting user experience and power consumption is a problem that needs to be urgently resolved.

SUMMARY

Embodiments of the present invention disclose a display method and a terminal, to optimize a current processing process of a display system, and reduce display power consumption of the terminal.

According to a first aspect, an embodiment of the present invention provides a Bluetooth connection method, including:

releasing, by a first terminal, a classic Bluetooth connection to a second terminal, where both the first terminal and the second terminal support Bluetooth low energy BLE and classic Bluetooth;

sending, by the first terminal, a BLE advertising message, where the BLE advertising message includes device information;

receiving, by the second terminal, the BLE advertising message, and obtaining the device information;

matching, by the second terminal, the device information with prestored device information;

if the device information obtained by the second terminal successfully matches the prestored device information, initiating, by the second terminal, a classic Bluetooth connection request to the first terminal; and establishing, by the first terminal, a classic Bluetooth connection to the second terminal.

The BLE and the classic Bluetooth are effectively combined in the foregoing Bluetooth connection solution. After a previous classic Bluetooth connection is released, the first terminal periodically advertises the device information of the first terminal by using the BLE advertising message, and the second terminal obtains or generates device information of a watch as a filtering condition for scanning. When the second terminal receives the BLE advertising message, and the device information matching succeeds, the second terminal initiates the classic Bluetooth connection request, and re-establishes the classic Bluetooth connection to the first terminal for communication. Power consumption of the BLE is low. In the entire solution, after the previous classic Bluetooth connection between the first terminal and the second terminal is released, the first terminal may periodically send the BLE advertising, so that the second terminal finds existence and a connection status of the first terminal in a timely manner, and implements a real-time classic Bluetooth automatic reconnection in a low energy state.

With reference to the first aspect, in a first implementation of the first aspect, before the matching, by the second terminal, the device information with prestored device information, the method further includes:

measuring, by the second terminal, signal strength of the BLE advertising message, and determining that the measured signal strength is greater than a signal strength threshold preset by the second terminal.

An effective connectable distance of the BLE may be simply associated with an effective connectable distance of the classic Bluetooth by means of measurement and comparison of the signal strength threshold, so that a success rate of a subsequent Bluetooth connection is ensured to some extent. In addition, a Bluetooth connection in a relatively long distance may be filtered out by setting the signal strength threshold, so that security is improved.

With reference to the first aspect and the first implementation of the first aspect, in a second implementation of the first aspect, the device information is a Bluetooth address of the first terminal; and the matching, by the second terminal, the device information with prestored device information is specifically: matching, by the second terminal, the obtained Bluetooth address of the first terminal with a prestored Bluetooth address.

The device information herein is the Bluetooth address of the first terminal. Because there is a previous Bluetooth connection between the first terminal and the second terminal, the second terminal may record the Bluetooth address of the first terminal, and match address information in the BLE advertising message with the recorded Bluetooth address, so that a reconnection can be simply, effectively, and rapidly performed.

With reference to the first aspect and the first implementation of the first aspect, in a third implementation of the first aspect, the device information is a first ciphertext generated by the first terminal; and the matching, by the second terminal, the device information with prestored device information is specifically: matching, by the second terminal, the obtained first ciphertext generated by the first terminal with a prestored second ciphertext generated by the second terminal.

The device information herein is the ciphertext generated by the first terminal, and therefore, security of the BLE advertising message is improved.

With reference to the third implementation of the first aspect, in a fourth implementation of the first aspect, the first terminal and the second terminal obtain a same public attribute and same status data, and generate the first ciphertext and the second ciphertext by using a same encryption algorithm.

The first terminal and the second terminal may obtain the same public attribute and the same status data in a connection process, but another device cannot learn the public attribute and the status data, so that encryption security can be further improved in this way.

With reference to the first aspect and the fourth implementation of the first aspect, in a fifth implementation of the first aspect, the public attribute and the status data include but are not limited to one or more of the following: a connectable address of a current connection, a release time point of a previous Bluetooth connection or a time period since previous Bluetooth is disconnected, a value transferred in a previous Bluetooth connection, a value transferred by using an advertising message before a previous Bluetooth connection is released, or a link key used in a previous successful classic Bluetooth connection.

The foregoing information types are examples of the public attribute and the status data of the Bluetooth connection between the first terminal and the second terminal, and one or a combination of multiple information types may be selected for encryption. These public attributes and the status data are non-fixed data of the Bluetooth connection between the first terminal and the second terminal, so that security can be improved to a great extent.

According to a second aspect, an embodiment of the present invention provides a Bluetooth connection method, including:

releasing, by a second terminal, a classic Bluetooth connection to a first terminal, where both the first terminal and the second terminal support Bluetooth low energy BLE and classic Bluetooth;

receiving, by the second terminal, a BLE advertising message sent by the first terminal, and obtaining device information from the BLE advertising message;

matching, by the second terminal, the device information with prestored device information; and if the device information obtained by the second terminal successfully matches the prestored device information, initiating, by the second terminal, a classic Bluetooth connection request to the first terminal, to establish a classic Bluetooth connection to the first terminal.

In the second aspect, the Bluetooth connection method in the present invention is described from a perspective of the second terminal. The BLE and the classic Bluetooth are effectively combined in the foregoing Bluetooth connection solution. After a previous classic Bluetooth connection is released, the second terminal may obtain or generate device information of a watch as a filtering condition for scanning. When the second terminal receives the BLE advertising message, and the device information matching succeeds, the second terminal initiates the classic Bluetooth connection request, and re-establishes the classic Bluetooth connection to the first terminal for communication. Power consumption of the BLE is low. After the previous classic Bluetooth connection between the first terminal and the second terminal is released, the second terminal may continuously perform BLE scanning, so that the second terminal finds existence and a connection status of the first terminal in a timely manner, and implements a real-time classic Bluetooth automatic reconnection in a low energy state.

For other implementations of the second aspect, refer to the related content in the first to the fifth implementations of the first aspect. Details are not described herein again in the present invention.

According to a third aspect, an embodiment of the present invention provides a Bluetooth connection method, including:

releasing, by a first terminal, a classic Bluetooth connection to a second terminal, where both the first terminal and the second terminal support Bluetooth low energy BLE and classic Bluetooth;

sending, by the first terminal, a BLE advertising message, where the BLE advertising message includes device information, so that the second terminal performs matching on the device information after receiving the BLE advertising message, and initiates a classic Bluetooth connection after the matching succeeds, where the first terminal is in a classic Bluetooth connectable state;

receiving, by the first terminal, a Bluetooth connection request of the second terminal; and establishing, by the first terminal, a classic Bluetooth connection to the second terminal.

In the third aspect, the Bluetooth connection method in the present invention is described from a perspective of the first terminal. After a previous classic Bluetooth connection is released, the first terminal periodically advertises the device information of the first terminal by using the BLE advertising message, so that the second terminal performs matching on the device information. When the second terminal receives the BLE advertising message, and the device information matching succeeds, the second terminal initiates the classic Bluetooth connection request, and re-establishes the classic Bluetooth connection to the first terminal for communication. Power consumption of the BLE is low. After the previous classic Bluetooth connection between the first terminal and the second terminal is released, the first terminal may continuously send the BLE advertising, so that the second terminal finds existence and a connection status of the first terminal in a timely manner, and implements a real-time classic Bluetooth automatic reconnection in a low energy state.

For other implementations of the third aspect, refer to the related content in the first to the fifth implementations of the first aspect. Details are not described herein again in the present invention.

According to a fourth aspect, an embodiment of the present invention provides a terminal that supports Bluetooth low energy BLE and classic Bluetooth, including: one or more processors, a memory, and a bus, where the one or more processors, the memory, and the display communicate with each other by using the bus;

the memory is configured to store an instruction; and the one or more processors are configured to invoke the instruction in the memory to perform the following steps:

receiving a BLE advertising message sent by a first terminal, and obtaining device information from the BLE advertising message;

matching the device information with prestored device information; and if the obtained device information successfully matches the prestored device information, initiating a classic Bluetooth connection request to the first terminal, to establish a classic Bluetooth connection to the first terminal.

The terminal provided in the fourth aspect may be configured to implement the Bluetooth connection method provided in the second aspect. The BLE and the classic Bluetooth are effectively combined in the foregoing Bluetooth connection solution. Power consumption of the BLE is low. After a previous classic Bluetooth connection between the terminal and the first terminal is released, the terminal may continuously perform BLE scanning, so that the terminal finds existence and a connection status of the first terminal in a timely manner, and implements a real-time classic Bluetooth automatic reconnection in a low energy state.

For other implementations of the fourth aspect, refer to the related content in the first to the fifth implementations of the first aspect. Details are not described herein again in the present invention.

According to a fifth aspect, an embodiment of the present invention provides a terminal that supports Bluetooth low energy BLE and classic Bluetooth, including: one or more processors, a memory, and a bus, where the one or more processors, the memory, and the display communicate with each other by using the bus;

the memory is configured to store an instruction; and the one or more processors are configured to invoke the instruction in the memory to perform the following steps:

sending a BLE advertising message, where the BLE advertising message includes device information, so that the second terminal performs matching on the device information after receiving the BLE advertising message, and initiates a classic Bluetooth connection after the matching succeeds, where the first terminal is in a classic Bluetooth connectable state; and receiving a Bluetooth connection request of the second terminal, and establishing a classic Bluetooth connection to the second terminal.

The terminal provided in the fifth aspect may be configured to implement the Bluetooth connection method provided in the third aspect. The BLE and the classic Bluetooth are effectively combined in the foregoing Bluetooth connection solution, and power consumption of the BLE is low. After a previous classic Bluetooth connection between the terminal and the second terminal is released, the terminal may continuously send the BLE advertising, so that the second terminal finds existence of the terminal in a timely manner, and implements a real-time classic Bluetooth automatic reconnection in a low energy state.

For other implementations of the fifth aspect, refer to the related content in the first to the fifth implementations of the first aspect. Details are not described herein again in the present invention.

According to a sixth aspect, an embodiment of the present invention provides a Bluetooth connection system, including: the terminal according to any one of the implementations of the fourth aspect and the terminal according to any one of the implementations of the fifth aspect.

According to the Bluetooth connection method and system, and the terminal, the BLE and the classic Bluetooth are effectively combined, and power consumption of the BLE Bluetooth is low. After the classic Bluetooth is disconnected, the BLE advertising message may be continuously sent or BLE scanning may be performed, so that Bluetooth devices can find each other in a timely manner, and a real-time classic Bluetooth automatic reconnection is implemented in a low energy state.

BRIEF DESCRIPTION OF DRAWINGS

To describe the technical solutions in the embodiments of the present invention more clearly, the following briefly describes the accompanying drawings required for describing the embodiments or the prior art. The accompanying drawings in the following description show merely some embodiments of the present invention, and a person of ordinary skill in the art may still derive other drawings from these accompanying drawings.

DESCRIPTION OF EMBODIMENTS

To make the objectives, technical solutions, and advantages of the present invention clearer, the following further describes the embodiments of the present invention in detail with reference to the accompanying drawings. To understand the present invention, the following detailed description mentions many specific details. However, a person skilled in the art should understand that the present invention may be implemented without these specific details. In other embodiments, well-known methods, processes, components, and circuits are not described in detail, so as to prevent the embodiments from being blurred. Apparently, the described embodiments are a part rather than all of the embodiments of the present invention. All other embodiments obtained by a person of ordinary skill in the art based on the embodiments of the present invention without creative efforts shall fall within the protection scope of the present invention.

Terms used in the embodiments of the present invention are intended to better describe specific embodiments, and are not intended to limit the present invention. The terms "a", "said" and "the" of singular forms used in the embodiments and the appended claims of the present invention are also intended to include plural forms, unless otherwise specified in the context clearly. In the specification, claims, and accompanying drawings of the present invention, the terms "first", "second", "third", and so on are intended to distinguish different objects but do not indicate a particular order. It should also be understood that, the term "and/or" used herein indicates and includes any or all possible combinations of one or more associated listed items. It should be further understood that the term "include" adopted in the specification specifies presence of features, integers, steps, operations, elements and/or components, with presence or attachment of other features, integers, steps, operations, components, elements, and their combinations not excluded.

Some terms in the embodiments of the present invention are described as follows: Bluetooth (Bluetooth, BT), a basic rate (Basic Rate, BR), an enhanced data rate (Enhanced Data Rate, EDR), a high speed (High Speed, HS), and Bluetooth low energy (Bluetooth Low Energy, BLE). The Bluetooth low energy may also be referred to as low energy Bluetooth.

Figure 1:
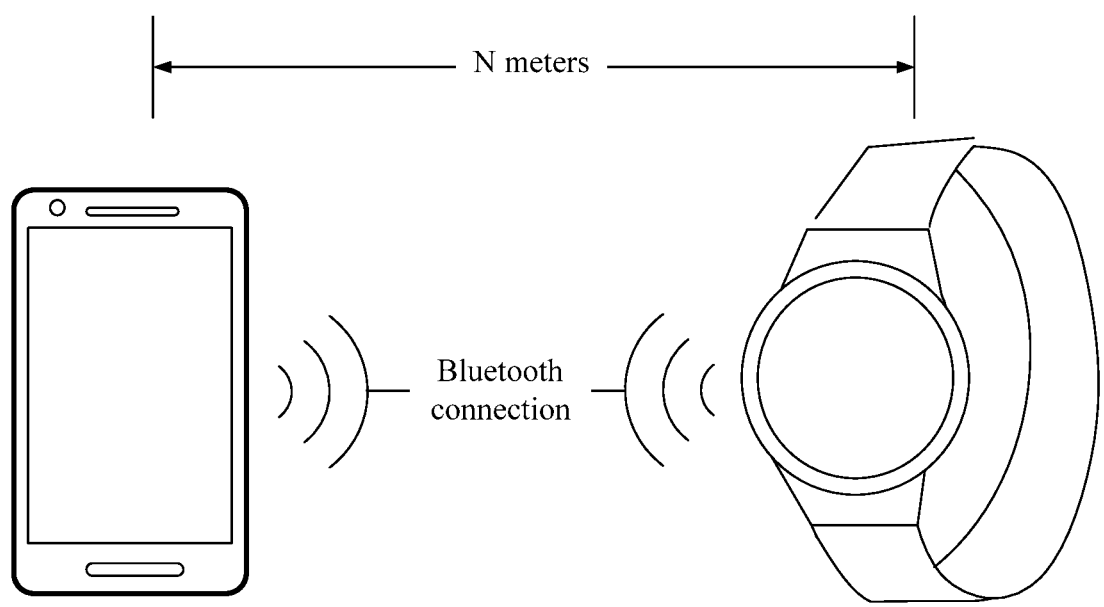
FIG. 1 is a schematic diagram of a Bluetooth connection between a mobile phone and a watch according to an embodiment of the present invention.

Referring to FIG. 1, short-range wireless communication may be performed between a mobile phone and a watch by using a Bluetooth connection. The mobile phone may be connected to the watch by using BLE or classic Bluetooth. A terminal that supports only a BLE connection may be referred to as a signal-mode Bluetooth terminal. A terminal that supports both a BLE connection and a classic Bluetooth connection may be referred to as a dual-mode Bluetooth terminal.

Bluetooth in the embodiments of the present invention is a wireless communications standard for short-range data exchange, and may include the classic Bluetooth and the BLE. The classic Bluetooth may also be referred to as conventional Bluetooth or standard Bluetooth. The classic Bluetooth is developed and improved based on Bluetooth in previous Bluetooth specification protocol versions 1.0, 1.2, 2.0+EDR, 2.1+EDR, 3.0+HS, and the like, and is a name generally called after the BLE appears. Compared with the BLE, currently, the classic Bluetooth is more appropriate for transmission with a relatively large amount of data, for example, voice transmission or music transmission. The BLE may also be referred to as Bluetooth Smart or the like, is developed based on the Wibree standard of Nokia, and was originally introduced in the Bluetooth specification protocol version 4.0. The BLE, as the name indicates, consumes extremely low power, and power consumption is 1/10 or less of that of the classic Bluetooth. The BLE is characterized by a short packet, high-efficiency coding, a short connection establishment time period, and the like. For related descriptions of the Bluetooth, refer to related content in Wikipedia. A visit website is: https://en.wikipedia.org/wiki/Bluetooth, and a last visit time is Jun. 25, 2016.

A user may make or answer a call, and send or receive an instant message or an SMS message by using a smartwatch that is connected to a mobile phone, or may record or detect a status of the user by using the watch, for example, a quantity of walking steps, a sleep status, a heart rate, or a running speed.

The "terminal" in the present invention is a dual-mode Bluetooth terminal that can implement a Bluetooth connection function, and the terminal may be a mobile phone, a watch, a wristband, a tablet computer, a point of sale (Point of Sales, POS) terminal, an in-vehicle computer, or the like. This is not specifically limited in the embodiments of the present invention. In the embodiments of the present invention, for ease of description, the mobile phone and the watch are mainly used as an example for description.

Figure 2:
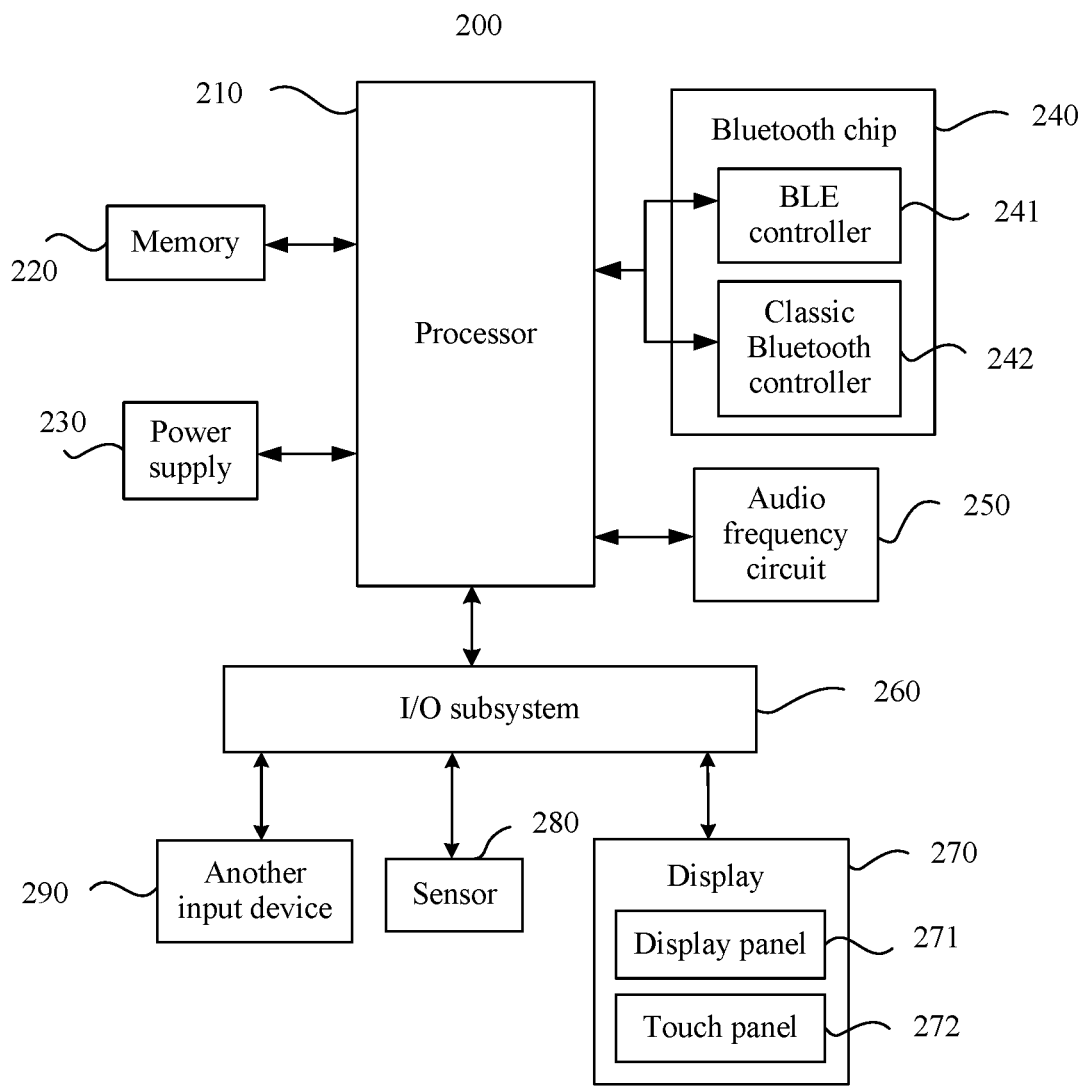
FIG. 2 is a structural diagram of hardware of a dual-mode terminal according to an embodiment of the present invention.

FIG. 2 shows a block diagram of a partial structure of a terminal 200 according to an embodiment of the present invention, and is applicable to the dual-mode Bluetooth terminal described in the embodiments of the present invention. Referring to FIG. 2, the terminal 200 may include components such as a processor 210, a memory 220, a power supply 230, a Bluetooth chip 240, an audio frequency circuit 250, an I/O subsystem 260, a display 270, a sensor 280, and another input device 290. A person skilled in the art may understand that the structure of the mobile terminal shown in FIG. 2 constitutes no limitation on the mobile terminal. The mobile terminal may include more or fewer components than those shown in the diagram, or some components may be combined, or some components may be separated, or the components may be disposed in a different manner.

The following specifically describes each constituent component of the terminal 200 with reference to FIG. 2.

The processor 210 is a control center of the terminal 200, and is connected to each part of the entire mobile terminal by using various interfaces and lines. By running or executing a software program and/or a module stored in the memory 220 and by invoking data stored in the memory 220, the processor 210 executes various functions of the terminal 200 and processes data, so as to perform overall monitoring on the mobile terminal. Optionally, the processor 210 may include one or more processors or processing modules. Preferably, an application processor (Application Processor, AP) and a modem processor may be integrated into the processor 210. The AP mainly processes an operating system, a user interface, an application program, and the like, and the modem processor mainly processes wireless communication. In this embodiment of the present invention, the processor 210 may further include a graphics processing unit GPU, and this is not specifically limited in the present invention. To implement the solution in the present invention, the processor 210 is further integrated with a Bluetooth module to implement a related function such as a Bluetooth connection and data transmission. It can be understood that, without invoking an instruction or data in the memory 220, some processors 210 may directly execute an instruction configured in the processor, to complete the related function. However, for ease of description, an expression "the processor 210 invokes the instruction in the memory to perform some operations or steps" may be used in this embodiment of the present invention, and details about executing the instruction by the processor 210 are not specifically limited.

The memory 220 may be configured to store the software program and the module, and the processor 210 executes various function applications of the terminal 200 and processes data by running the software program and the module stored in the memory 220. The memory 220 may mainly include a program storage area and a data storage area. The program storage area may store an operating system, an application program required by at least one function (such as Bluetooth control or a Bluetooth connection function), and the like. The data storage area may store data (such as a ciphertext generation algorithm or a Bluetooth connection record) that is created according to use of the terminal 200, and the like. In addition, the memory 220 may include a high-speed random access memory, and may further include a non-volatile memory, such as at least one magnetic disk storage component, a flash memory component, or another volatile solid-state storage component.

The power supply 230, for example, a battery, may supply power to each component. Preferably, the power supply may be logically connected to the processor 210 by using a power supply management system, so as to implement functions such as power charging management, power discharging management, and power consumption management by using the power supply management system.

The terminal 200 may further include a Bluetooth chip 240. In this embodiment of the present invention, the Bluetooth chip 240 may include a BLE controller 241 and a classic Bluetooth controller 242. The BLE controller 241 and the classic Bluetooth controller 242 may send and receive a Bluetooth radio frequency signal. For example, the BLE controller 241 may send and receive a BLE advertising message, and the classic Bluetooth controller 242 may send and receive a classic Bluetooth connection request and a classic Bluetooth connection response. The terminal 200 may control the BLE controller 241 and the classic Bluetooth controller 242 in the Bluetooth chip 240 by using the Bluetooth module in the processor 210.

The Bluetooth chip 240 may prestore some data, for example, a prestored signal strength threshold of a Bluetooth signal, an address of a target Bluetooth terminal that can be connected, a ciphertext, or another identity. The Bluetooth chip 240 may independently perform some simple processing, for example, detecting signal strength of a Bluetooth-related message, and/or comparing the detected signal strength with the prestored signal strength threshold, parsing the Bluetooth-related message such as an advertising message, and matching an address, a ciphertext, or another identity in the Bluetooth-related message with corresponding prestored information.

It can be understood that the BLE controller 241 and the classic Bluetooth controller 242 may be independent hardware modules, or may be logically independent modules whose hardware is integrated together. It can be further understood that the Bluetooth chip 240 may belong to a category of the processor 210. In addition, the terminal 200 may have no independent Bluetooth chip. A circuit and a function related to the Bluetooth chip 240 may be integrated into the processor 210. For example, the circuit and the function may be integrated into an AP of a mobile phone or an AP of a watch. In this case, the Bluetooth module integrates all the described function modules related to Bluetooth function implementation.

The audio frequency circuit 250 may include a microphone and a loudspeaker, and provide an audio interface between a user and the terminal 200. The audio frequency circuit 250 may output audio data to the Bluetooth module or the Bluetooth chip 240, to send the audio data to another terminal, or output audio data obtained from the Bluetooth module or the Bluetooth chip 240 to the user, or the like.

The I/O subsystem 260 is used to control an input/output external device, and may include another device input controller, a sensor controller, and a display controller.

The terminal may include the display 270. The display 270 may be configured to display information entered by the user or information provided for the user, and various menus of the terminal 200, and may further receive user input. Specifically, the display 270 may include a display panel 271 and a touch panel 272. The display controller in the I/O subsystem 260 may receive a signal from the display 270 and/or send a signal to the display 270, so as to implement man-machine interaction.

The terminal 200 may further include one or more sensors 280, such as a light sensor, a motion sensor, and another sensor. The sensor controller in the I/O subsystem 260 may receive a signal from the one or more sensors 280 and/or send a signal to the one or more sensors 280.

The another input device 290 may be configured to: receive entered numeral or character information, and generate key signal input related to a user setting and function control that are of the terminal 200. One or more other device input controllers receive a signal from the another input device 290 and/or send a signal to the another input device 290.

Although not shown, the terminal 200 may further include a radio frequency circuit, configured to receive and send information or receive and send a signal during a call. The terminal 200 may further include a camera lens, a wireless fidelity (Wireless-Fidelity, Wi-Fi or WiFi) module, an infrared module, and the like. Details are not described herein.

FIG. 2 is a general structural block diagram of the terminal. It can be understood that different terminals may include more or fewer structures than the structure in FIG. 2.

It should be noted that, the terminal for implementing a Bluetooth connection method in the following embodiment of the present invention may be a processor or a processor with a necessary auxiliary circuit and a necessary auxiliary component, a chip or a chip group including multiple chips, or the like.

Different terminals that have the structure shown in FIG. 2 may implement a Bluetooth connection in a specific range. However, if the specific range exceeds an effective Bluetooth connection range, the Bluetooth connection between the terminals is automatically released. For example, a classic Bluetooth connection is continuously maintained between a smartwatch and a mobile phone of a user. However, when the user goes for a run, the user goes out only with the watch because it is inconvenient to take the mobile phone. When a distance between the watch worn by the user and the mobile phone exceeds an effective range, such as 10 meters, of the classic Bluetooth connection, the classic Bluetooth connection between the watch and the mobile phone is automatically released. After the classic Bluetooth connection is released, if the watch no longer automatically attempts to connect to the mobile phone, once the connection is released, an automatic reconnection between the watch and the mobile phone cannot be implemented. However, if the watch (or the mobile phone) keeps sending a message to attempt at a reconnection, and the mobile phone (or the watch) maintains a connectable state, if the reconnection cannot be implemented in a long time period, power of the watch and power of the mobile phone are greatly consumed, and consequently, a standby time period is shortened.

To implement an automatic reconnection between different terminals after a classic Bluetooth connection is released, relatively balanced processing is performed based on the foregoing two cases in a current technical solution. That is, the watch (or the mobile phone) makes a specific quantity of attempts at a reconnection to the mobile phone (or the watch) in a specific time range at a predetermined time interval. For example, the watch (or the mobile phone) attempts to connect at 5-minute intervals. If the watch (or the mobile phone) still does not connect to the mobile phone (or the watch) after ten attempts, no further active connection attempt is made. Alternatively, in an existing implementation, the watch (or the mobile phone) attempts to connect for the first time after an interval of 2 seconds; if the connection fails, attempts to connect for the second time after an interval of 4 seconds; if the connection fails again, attempts to connect for the third time after an interval of 8 seconds; and if the connection still fails, attempts to connect for the next time after an interval of two times of a previous time interval. Optionally, when a time interval reaches a specific value, for example, 256 seconds, the watch (or the mobile phone) attempts to connect at an interval of 256 seconds before the connection succeeds. Both power consumption and a delay are considered in the foregoing solution, and a Bluetooth automatic reconnection between different terminals is optimized. However, to some extent, the delay still exists in the classic Bluetooth automatic connection in the foregoing solution, and the power consumption may be further optimized.

To further optimize the foregoing Bluetooth automatic reconnection, an embodiment of the present invention provides a Bluetooth connection method.

Figure 3:
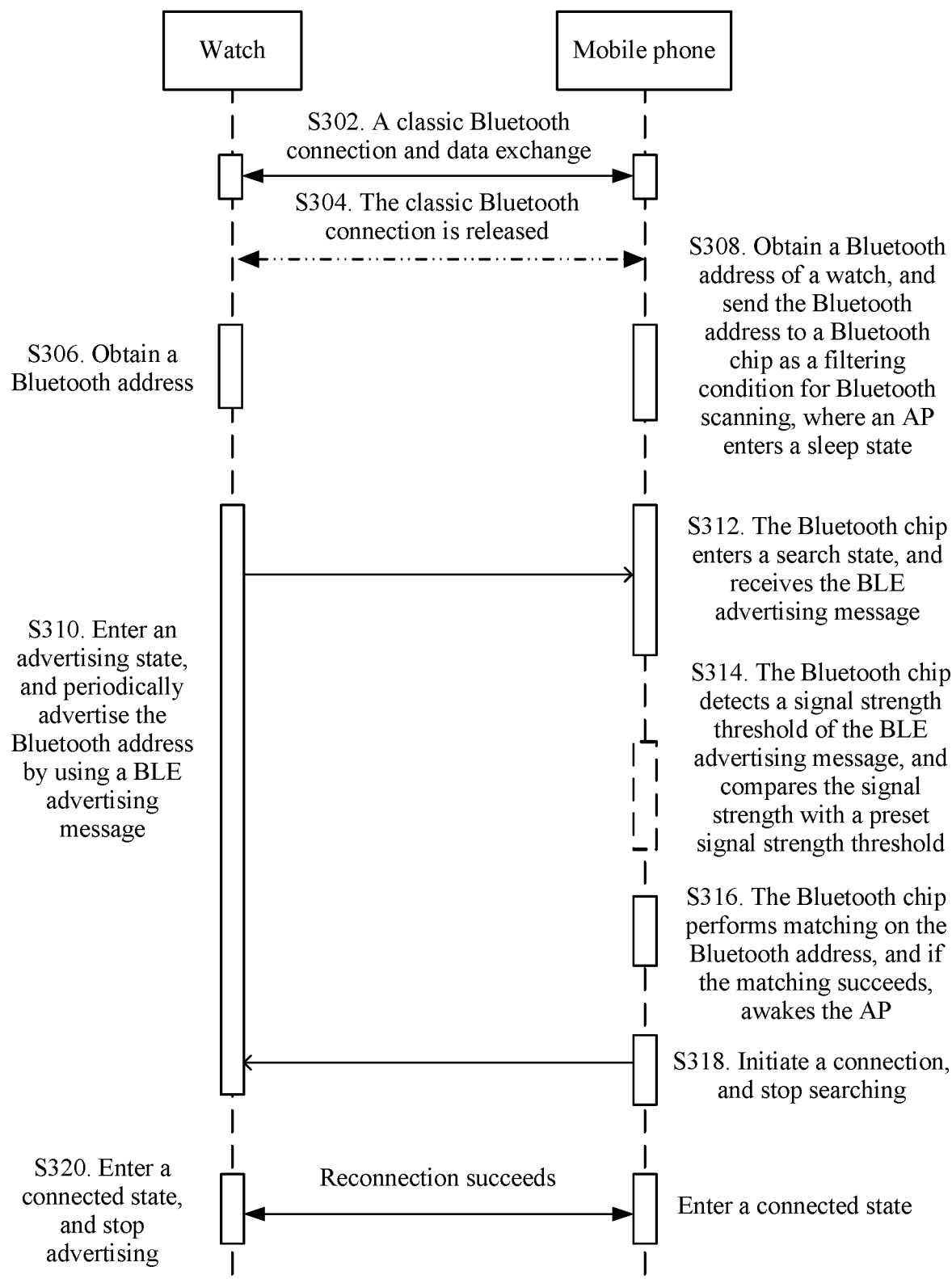
FIG. 3 is a schematic diagram of a method for performing a Bluetooth connection between a watch and a mobile phone according to an embodiment of the present invention.

As shown in FIG. 3, the Bluetooth connection method provided in this embodiment of the present invention specifically includes the following steps.

S302. Maintain a classic Bluetooth connection between a mobile phone and a watch, and perform corresponding data transmission by using the classic Bluetooth connection.

When the classic Bluetooth connection is established between the mobile phone and the watch, data may be transmitted to each other by using the classic Bluetooth connection. The mobile phone and the watch may obtain a connection status, identity information, and the like of each other. In addition, the mobile phone and the watch may separately record a classic Bluetooth connection time point, and may record some values transferred in the connection, a link key (Link Key) used when the connection succeeds, and the like.

S304. Release the classic Bluetooth connection between the mobile phone and the watch.

The classic Bluetooth connection between the mobile phone and the watch is released because a distance between the mobile phone and the watch may exceed an effective distance of Bluetooth, or there may be another reason. For example, the mobile phone or the watch is running out of power, or there is an environmental factor. This is not limited herein.

When the classic Bluetooth connection between the mobile phone and the watch is released, the mobile phone and the watch may separately record a release time point of this classic Bluetooth connection.

S306. The watch obtains a Bluetooth address of the watch.

After the classic Bluetooth connection between the watch and the mobile phone is released, the watch may obtain the Bluetooth address of the watch, and advertise the Bluetooth address of the watch by using a BLE advertising message. The Bluetooth address may be a media access control (Media Access Control, MAC) address of a Bluetooth device, or may be another accessible address for implementing a Bluetooth connection.

S308. After the classic Bluetooth connection between the mobile phone and the watch is released, an application processor (Application Processor, AP) of the mobile phone obtains a Bluetooth address of the watch from information recorded in the mobile phone, and sends the Bluetooth address of the watch to a Bluetooth chip of the mobile phone. The Bluetooth chip of the mobile phone prestores the Bluetooth address of the watch sent by the AP, and may use the Bluetooth address as a filtering condition for scanning by the Bluetooth chip. That is, after finding an advertising message, the Bluetooth chip of the mobile phone first needs to determine whether a Bluetooth address in the advertising message matches the prestored Bluetooth address. After the AP sends the Bluetooth address to the Bluetooth chip, a Bluetooth-related module in the AP may enter a sleep state, so as to save power.

S310. The watch enters an advertising state, and periodically advertises the Bluetooth address of the watch by using a BLE advertising message.

The watch periodically sends the BLE advertising message, and the BLE advertising message includes the Bluetooth address of the watch. Optionally, when the watch enters an advertising state, an AP of the watch, or a Bluetooth module of the AP may be in a sleep state.

Optionally, when the watch sends the BLE advertising message, a classic Bluetooth controller of the watch may be in a connectable state, that is, a to-be-connected page scan (Page Scan) state, so that a classic Bluetooth connection request of the mobile phone is received. The classic Bluetooth controller herein is a control module for implementing classic Bluetooth.

In another optional implementation, the classic Bluetooth controller of the watch may be periodically in a sleep state, so that power consumption is further reduced.

Optionally, a timing cycle for periodic sleep of the classic Bluetooth controller of the watch may be corresponding to a cycle of the BLE advertising message. That is, the classic Bluetooth controller of the watch may be in a to-be-connected scanning state while the watch sends the BLE advertising message, and the state lasts for a preset time period. Optionally, the classic Bluetooth controller of the watch may be in a to-be-connected scanning state at an interval of time after the watch sends the BLE advertising message, and the time interval may be an empirical value or a measured value. A sending time point of the BLE advertising message, a time point of parsing and matching BLE device information by the mobile phone, and a time point of triggering the AP to send a classic Bluetooth connection message, and the like may be mainly considered, so that a sleep time period of the classic Bluetooth controller is further optimized, and power consumption is reduced.

S312. The Bluetooth chip of the mobile phone enters a search state, and receives the BLE advertising message.

The Bluetooth chip of the mobile phone enters a search state, that is, a scanning state, to receive a BLE advertising packet (advertising packets) sent by the watch.

S314. Optionally, when receiving the BLE advertising message, the Bluetooth chip of the mobile phone measures signal strength of the BLE advertising message, and when the measured signal strength of the BLE advertising message is greater than a preset signal strength value, obtains device information from the advertising message; when the measured signal strength of the BLE advertising message is not greater than a preset signal strength value, ignores the advertising message.

An effective connectable distance of BLE is different from an effective connectable distance of classic Bluetooth. The effective connectable distances of the BLE and the classic Bluetooth depend on factors such as transmit power, a device characteristic, and an environment. Generally, the effective connectable distance of the BLE may be tens of meters, or may reach 100 meters, and the effective connectable distance of the classic Bluetooth may be several meters, more than ten meters, or tens of meters. The effective connectable distance of the BLE may be simply associated with the effective connectable distance of the classic Bluetooth by setting the signal strength threshold, so that a success rate of a subsequent Bluetooth connection is ensured to some extent. In addition, a Bluetooth connection in a relatively long distance may be filtered out by setting the signal strength threshold, so that security is improved.

The preset signal strength value may be an empirical signal strength value, or may be a signal strength value that is obtained by a person skilled in the art according to a measurement result in consideration of a power factor, and the like, or may be a signal strength value that is set by a user according to a specific requirement, or the like. Setting of the preset signal strength value may further ensure effectiveness and security of the subsequent classic Bluetooth connection. The preset signal strength value is not specifically limited in this embodiment of the present invention.

It can be understood that this step is an optional step for implementing this solution, instead of a mandatory step. In this solution, the effectiveness of the subsequent classic Bluetooth connection may be further ensured by using another solution. For example, for a same terminal, the effective connectable distance of the BLE may be directly associated with the effective connectable distance of the classic Bluetooth, that is, the foregoing two effective connectable distances are set to a same or an almost same value.

S316. The Bluetooth chip of the mobile phone determines whether a ciphertext in the BLE advertising message matches a prestored ciphertext, and if the ciphertext in the BLE advertising message matches the prestored ciphertext, the Bluetooth chip awakes the AP; otherwise, the Bluetooth chip ignores the BLE advertising message.

Preferably, when the mobile phone determines that the ciphertext in the BLE advertising message matches the prestored ciphertext, instead of performing a BLE connection to the watch, the mobile phone triggers a subsequent classic Bluetooth connection. That is, in an entire Bluetooth connection process, the BLE connection between the mobile phone and the watch may not be performed, so that resources can be saved. In addition, after the classic Bluetooth connection is performed, a BLE connection to another Bluetooth device that supports the BLE may be further performed for communication, so that flexibility and variety of a Bluetooth connection between terminals are increased.

The Bluetooth chip of the mobile phone may awake the AP by means of hardware interruption. The mobile phone may obtain a type of the interruption by using a host controller interface (Host controller interface, HCI) event, to perform the subsequent classic Bluetooth connection operation.

S318. After being awakened, the AP of the mobile phone sends a classic Bluetooth connection request according to the Bluetooth address of the watch.

The mobile phone obtains the classic Bluetooth connection address of the watch, and sends the connection request to the watch. If the watch is in a to-be-connected state, and after receiving the connection request sent by the mobile phone, the watch may establish the classic Bluetooth connection to the mobile phone.

When determining that the Bluetooth address in the received BLE advertising message matches the prestored Bluetooth address, the mobile phone may stop searching, that is, stop scanning.

After the matching between the foregoing Bluetooth addresses succeeds, the mobile phone may initiate classic Bluetooth searching, and then perform a connection. Optionally, the mobile phone receives the BLE advertising packet of the watch, and performs matching on some data in the advertising packet. Therefore, when the classic Bluetooth connection is performed between the mobile phone and the watch, instead of establishing a searching physical channel (physical channel) to perform the classic Bluetooth searching, the mobile phone directly initiates the classic Bluetooth connection request and enters a connected state.

S320. After receiving the classic Bluetooth connection request sent by the mobile phone, the watch stops advertising, and re-establishes a classic Bluetooth connection to the mobile phone.

When the watch sends the BLE advertising message, the classic Bluetooth controller of the watch is in a connectable state. For the connectable state of the classic Bluetooth controller of the watch, refer to the foregoing related description. Details are not described herein again.

After receiving the classic Bluetooth connection request sent by the mobile phone, the watch responds to the connection request of the mobile phone, performs the classic Bluetooth connection to the mobile phone, and establishes a connection physical channel (physical channel).

The BLE and the classic Bluetooth are effectively combined in the foregoing Bluetooth connection solution. After a previous classic Bluetooth connection is released, the watch periodically performs plaintext advertising on the connectable Bluetooth address by using the BLE advertising message, and the mobile phone obtains the Bluetooth address from the recorded information, and sends the Bluetooth address to the Bluetooth chip as a filtering condition for scanning the Bluetooth advertising message. When the mobile phone receives the BLE advertising message, and the address matching succeeds, the mobile phone awakes the AP of the mobile phone to initiate the classic Bluetooth connection request, and re-establishes the classic Bluetooth connection to the watch for communication. In the entire solution, after the previous classic Bluetooth connection between the mobile phone and the watch is released, the watch may periodically send the BLE advertising, so that the mobile phone finds existence and a connection status of the watch in a timely manner, and implements a real-time classic Bluetooth automatic reconnection in a low energy state.

In the foregoing Bluetooth connection solution, the real-time classic Bluetooth reconnection can be implemented in a low energy state. In the foregoing Bluetooth solution, Bluetooth connection security can be improved by matching the addresses and setting the signal strength threshold. However, a Bluetooth device continuously performs Bluetooth advertising on an address of the Bluetooth device, and identity of the Bluetooth device is exposed for a long time period. Consequently, a trace risk, an attack risk, and the like may be increased. To further ensure BLE advertising security, based on the foregoing Bluetooth connection solution, an embodiment of the present invention provides another Bluetooth connection method.

Figure 4:
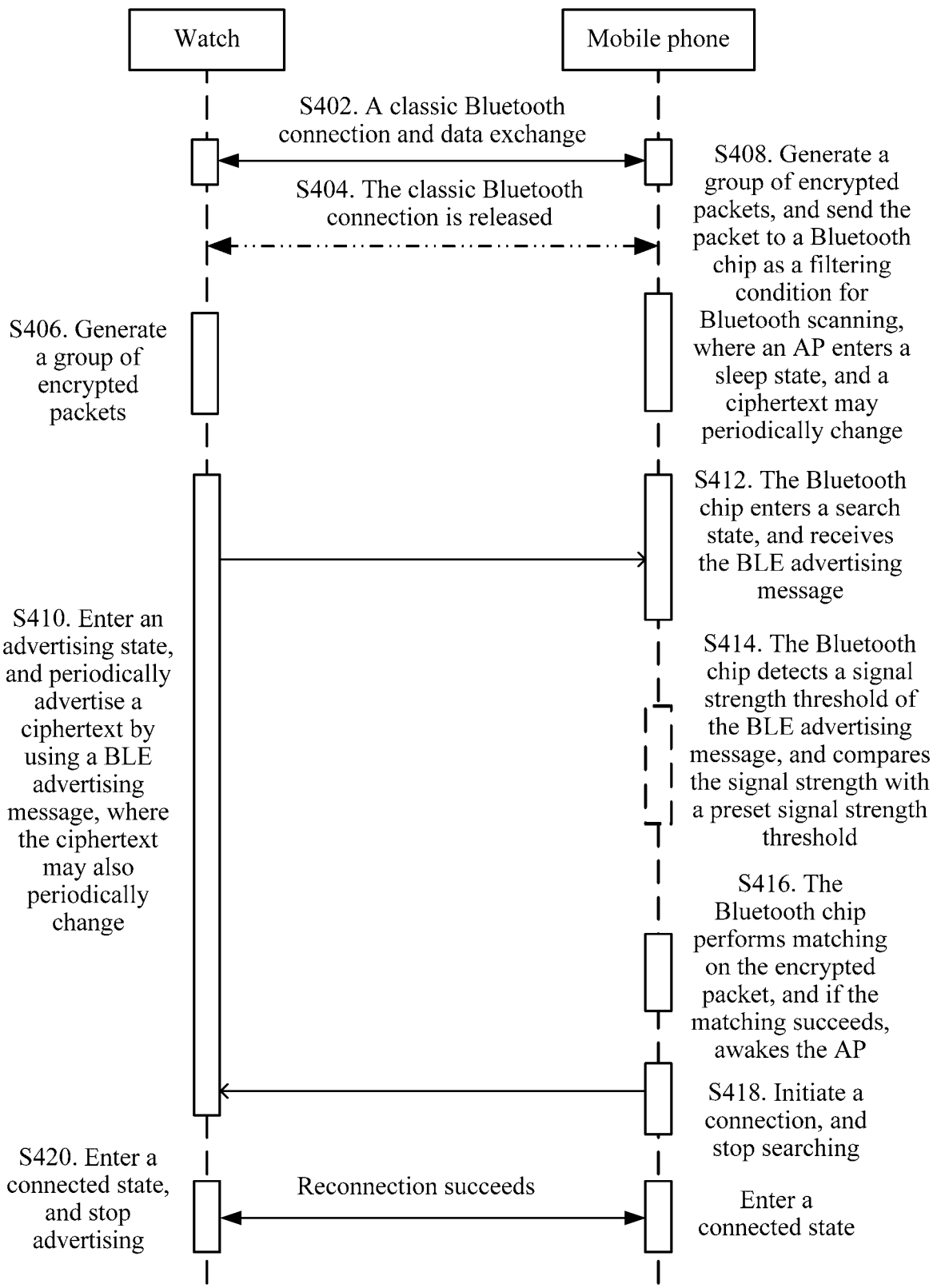
FIG. 4 is a schematic diagram of another method for performing a Bluetooth connection between a watch and a mobile phone according to an embodiment of the present invention.

As shown in FIG. 4, the method is a method described based on the method in FIG. 3. For same or related content, such as S402-S404, S412-S414, and S418-S420, refer to the description of the method in FIG. 3. Details are not described herein again. Steps S406-S410 and S416 are mainly described below.

S406. After a Bluetooth connection between a watch and a mobile phone is released, the watch may generate a group of encrypted packets, that is, ciphertexts.

The watch may generate a group of ciphertexts by using a preset algorithm. The algorithm may be a group of determined ciphertext generation algorithms preset by the watch, or the algorithm may be one of multiple preset ciphertext generation algorithms. If two parties of the Bluetooth connection agree to support multiple ciphertext generation algorithms, the watch may specify corresponding ciphertext generation information in an advertising message.

S408. After the Bluetooth connection between the mobile phone and the watch is released, an application processor (Application Processor, AP) of the mobile phone may also generate a group of ciphertexts by using an algorithm, and send the ciphertext to a Bluetooth chip of the mobile phone as a filtering condition for scanning by the Bluetooth chip. After the AP sends the generated ciphertext to the Bluetooth chip, a Bluetooth-related module in the AP may enter a sleep state, so as to save power.

The algorithm for generating the ciphertext by the mobile phone is the same as the algorithm for generating the ciphertext by the watch, so as to ensure the ciphertexts generated by the mobile phone and the watch can successfully match each other. If the mobile phone and the watch agree on multiple ciphertext generation algorithms, multiple ciphertexts may be first generated according to different algorithms, or a ciphertext is generated after a corresponding algorithm identifier is obtained from the advertising message, and then matching is performed.

The AP of the mobile phone may send the ciphertext to the Bluetooth chip for storage. After parsing a received BLE advertising message, the Bluetooth chip may obtain the ciphertext generated by the watch from the advertising message. The Bluetooth chip may match the stored ciphertext with the ciphertext in the BLE advertising message, and if the stored ciphertext is the same as the ciphertext in the BLE advertising message, the matching succeeds, or if the stored ciphertext is different from the ciphertext in the BLE advertising message, the BLE advertising message is ignored.

Matching the ciphertexts by the Bluetooth chip of the mobile phone may be: matching is directly performed after the ciphertext in the BLE advertising message is obtained by means of parsing, to improve matching efficiency; or matching is performed after the obtained ciphertext is processed again, for example, matching is performed after the ciphertext is encrypted or decrypted again by using a preset algorithm, to further improve security. This is not limited in this embodiment of the present invention.

Optionally, the ciphertext may be generated by the Bluetooth chip of the mobile phone in the foregoing solution.

The mobile phone may periodically update the generated ciphertext, and change scanned content. That is, the ciphertext may periodically change. Optionally, the mobile phone and the watch may change a ciphertext generation manner or content at intervals. For example, the mobile phone and the watch may regenerate a ciphertext at 15-minute intervals. The generating a ciphertext at 15-minute intervals may be changing a ciphertext generation algorithm at 15-minute intervals, or may be changing, at 15-minute intervals, data on which encryption processing is to be performed. For example, if encrypted data includes a time period since a previous disconnection, the time period since a previous disconnection is obtained at 15-minute intervals. Because the time period changes, content of a ciphertext that is generated at 15-minute intervals also changes. The encrypted data is not limited to the time period since a previous disconnection, or may be another agreed value. A method for periodically changing advertised and/or scanned content by the mobile phone and the watch is not specifically limited herein in this embodiment of the present invention. The mobile phone and the watch periodically change the advertised and/or scanned content, so that security can be further improved.

S410. The watch enters an advertising state, and periodically advertises the ciphertext of the watch by using a BLE advertising message.

The watch periodically sends the BLE advertising message, and the BLE advertising message includes the ciphertext.

Optionally, the watch may add the ciphertext to a field in the advertising message. For example, a Bluetooth private address that cannot be parsed may be advertised in the BLE advertising message. The watch adds the generated ciphertext to a field that is not defined in a standard and that is in the BLE advertising message for advertising, and the mobile phone may identify the watch by matching the ciphertext in the BLE advertising message. For a ciphertext generation manner and a ciphertext advertising and carrying manner, refer to detailed descriptions of the following embodiment. The field that is not defined in the standard may be referred to as a reversed field, an extensible field, or the like. This is not limited herein.

For other related content of step S410, refer to the description in step S310. Details are not described herein again.

Optionally, corresponding to periodically updating the ciphertext by the mobile phone, the watch may periodically change the advertised content. For specific details, refer to the description in step S408. Details are not described herein again. S416. The Bluetooth chip of the mobile phone determines whether the ciphertext in the BLE advertising message matches a prestored ciphertext.

The mobile phone may parse the BLE advertising message to obtain the ciphertext generated by the watch. If the watch sends the ciphertext by using a private address, the mobile phone may parse a corresponding field of the private address to obtain the ciphertext. After obtaining the ciphertext of the watch by means of parsing, the mobile phone matches the ciphertext with the ciphertext generated by the mobile phone. If the ciphertext in the BLE advertising message matches the prestored ciphertext, the Bluetooth chip awakes the AP; otherwise, the Bluetooth chip ignores the BLE advertising message.

When the mobile phone determines that the ciphertext in the BLE advertising message matches the prestored ciphertext, the mobile phone may perform a BLE connection to the watch. Preferably, when the mobile phone determines that the ciphertext in the BLE advertising message matches the prestored ciphertext, the mobile phone may directly trigger a subsequent classic Bluetooth connection instead of performing a BLE connection to the watch.

The Bluetooth chip of the mobile phone may awake the AP by means of hardware interruption. The mobile phone may obtain a type of the interruption by using an HCI event, so as to perform the subsequent classic Bluetooth connection operation.

It can be understood that both the Bluetooth address carried in the BLE advertising performed by the watch in the method shown in FIG. 3 and the ciphertext in the device information BLE advertising performed by the watch in the method shown in FIG. 4 may be referred to as device information. The Bluetooth chip of the mobile phone performs matching on the device information, and after the matching succeeds, awakes the AP to perform a classic Bluetooth connection. Optionally, the device information may include not only a Bluetooth address but also a ciphertext. That is, the mobile phone not only performs matching on the Bluetooth address but also performs matching on the ciphertext. It can be understood that the device information may be in another form. This is not specifically limited in this embodiment of the present invention.

Similar to the method shown in FIG. 3, BLE and classic Bluetooth are effectively combined in the Bluetooth connection solution shown in FIG. 4. After a previous classic Bluetooth connection is released, the watch periodically advertises the generated ciphertext by using the BLE advertising message, and the mobile phone generates the ciphertext by using the same algorithm, and sends the ciphertext to the Bluetooth chip as a filtering condition for scanning the Bluetooth advertising message. When the mobile phone receives the BLE advertising message, and the ciphertext matching succeeds, the mobile phone awakes the AP of the mobile phone to initiate a classic Bluetooth connection request, and re-establishes the classic Bluetooth connection to the watch for communication. In the entire solution, after the previous classic Bluetooth connection between the mobile phone and the watch is released, the watch may periodically send the BLE advertising, so that the mobile phone finds existence and a connection status of the watch in a timely manner, and implements a real-time classic Bluetooth automatic reconnection in a low energy state. In addition, the watch and the mobile phone separately generate the ciphertexts, and perform the classic Bluetooth connection after the ciphertext matching succeeds, so that security of the Bluetooth connection is further improved.

Based on the Bluetooth connection method shown in FIG. 4, an embodiment of the present invention further provides a specific ciphertext generation and advertising method. It can be understood that the ciphertext generation and advertising method is merely an example, and constitutes no limitation to this embodiment of the present invention. In addition, the ciphertext generation and advertising method may not be limited to the methods in FIG. 3 and FIG. 4. For example, the ciphertext generation and advertising method may be used by a dual-mode Bluetooth terminal, and includes but is not limited to the methods in FIG. 3 and FIG. 4; or may be used by a single-mode Bluetooth terminal, for example, the method is applied to a BLE advertising and connection process.

Most of current wireless communications devices include a MAC address. The MAC address is unique, and is usually used as a device identifier in network communication. The MAC address is mainly allocated by a manufacture of a device and is stored in the device. If two devices in the network have a same MAC address, a network communication problem is caused. Therefore, the manufacture of the device is very cautious about allocating the MAC address to ensure uniqueness of the address. A Bluetooth device has a device address of the Bluetooth device. The device address is generally referred to as BD_ADDR (Bluetooth Device Address) in a core Bluetooth specification, and the BD_ADDR is used for device identification in a process of connection, matching, and the like by the Bluetooth device. The Bluetooth device may use a public address (Public Device Address), or may use a random address (Random Device Address). A private address is one type of random address. Currently, BLE may support a characteristic of the private address.

Figure 5:
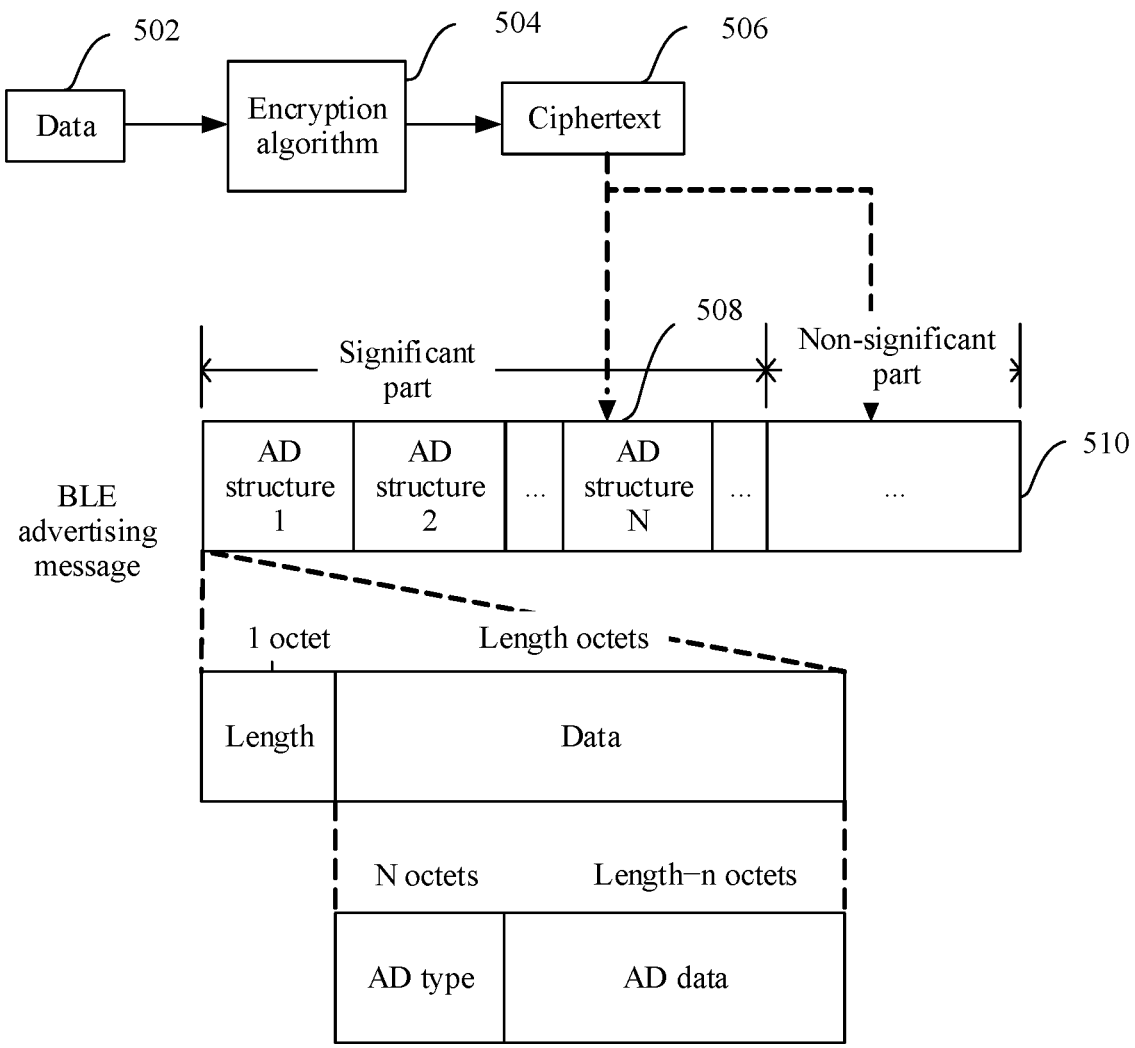
FIG. 5 is a schematic diagram of ciphertext generation and advertising according to an embodiment of the present invention.

As shown in FIG. 5, after detecting that a classic Bluetooth connection is released, a mobile phone and a watch may separately obtain a same public attribute and same status data that are of the connection. That is, data 502 to be encrypted by using an encryption algorithm is encrypted by using a preset algorithm 504 to generate a ciphertext 506. The preset algorithm 504 may be a secure hash algorithm (Secure Hash Algorithm, SHA1), or may be another encryption algorithm. This is not specifically limited in this embodiment of the present invention. Because the mobile phone and the watch obtain the same public attribute and the same status data, that is, the input data 502 on which algorithm encryption is performed is the same, and the ciphertext 506 that is output by means of algorithm encryption is also the same. The public attribute may include a connectable address, a link key, and the like, and the status data may include a start time point or an end time point of a Bluetooth connection, a value transferred in an advertising message, a value transferred after the connection, and the like. It can be understood that the public attribute and the status data in this embodiment of the present invention may be another type of information other than the examples. This is not specifically limited herein.

Optionally, the data 502 on which algorithm encryption is performed may include but is not limited to the following several types:

(1) An Access Address (Access Address) of a Current Connection

An access address may be an advertising access address of a current connection, or may be a data access address used by two devices after a connection is established. The data access address herein is a random value, and different connections may have different values. A terminal may generate, according to a requirement, different random values that meet a specific rule.

(2) A Link Key (Link Key) used in a Previous Successful Classic Bluetooth Connection Different terminals may agree on different link keys, and link keys used by a same terminal in all Bluetooth connections may be different. Data used for algorithm encryption may be a link key used in a previous successful connection, or may be a link key used in a former successful connection.

(3) A Start Time Point or an End Time Point of a Previous Bluetooth Connection or a Time Period since Previous Bluetooth is Disconnected The mobile phone and the watch may separately record a release time point of a previous Bluetooth connection, and release time points of different terminals or a same terminal in all Bluetooth connections are different. Therefore, the Bluetooth disconnection time point or the time period since the previous Bluetooth is disconnected may differ, and is uncertain and random. Optionally, some errors may occur when the mobile phone and the watch record the time, and the mobile phone and the watch may perform some processing on the time. For example, the time period since the previous Bluetooth is disconnected recorded by the mobile phone is 28 minutes, and the time period recorded by the watch is 30 minutes. The mobile phone and the watch may separately perform rounding off by using the 30 minutes as a reference. Therefore, the time period since the previous Bluetooth connection is released after being processed by the mobile phone and the watch is 30 minutes. It can be understood that the mobile phone and the watch may perform processing in another manner, and this is not limited herein.

(4) A Value Transferred in a Previous Bluetooth Connection

Data may be transferred for communication in a Bluetooth connected state of the mobile phone and the watch. The transferred value may be a value that is specially transferred for ciphertext generation, or may be a value agreed on in normal data exchange.

(5) A Value Transferred by using an Advertising Message before a Previous Bluetooth Connection is Released Before a previous Bluetooth connection is released, the mobile phone and the watch may send and receive data by using an advertising message. The data is similar to the value in (3), and may be a value that is specially transferred for ciphertext generation, or may be a value agreed on in normal data exchange.

The examples of the data that may be used for encryption are merely some simple examples, and the encrypted data may further include another public attribute or other status data. The data used for algorithm encryption may be one or more of the examples, and may be predetermined by two connected parties, or may be specified according to the advertising message.

In the foregoing examples, a part or all of the data that may be used for algorithm encryption is not fixed. Data used for encryption in each ciphertext generation process is independent and irregular. In this way, a third-party terminal neither can directly obtain content included in the data used for algorithm encryption, nor can learn a specific value of the data used for algorithm encryption. If an error exists in the value of the data used for algorithm encryption, the data may be processed in an earlier period to generate a determined unique ciphertext by means of encryption, or an allowed error range may be set to generate a matchable range of a group of ciphertexts. This is not specifically limited in this embodiment of the present invention.

The watch may add the generated ciphertext 506 to a field that is not defined in a standard or a reserved field in the BLE advertising message, for example, an extensible AD structure 508 in the BLE advertising message, or an invalid part 510, defined in the standard, in the BLE message as a part of the BLE advertising message. Specifically, the ciphertext may be added to manufacture data or service data (service data) in the BLE advertising message, or another field. This is not specifically limited in this embodiment of the present invention. It can be understood that the watch adds the generated ciphertext to an extensible field that is not defined in the standard and that is in the BLE advertising message, and this is an implementation for advertising by carrying the ciphertext. Optionally, the ciphertext may be added to an address field, for example, an extensible field in an address of the watch or the mobile phone. This is not specifically limited in the present invention.

Figure 6:
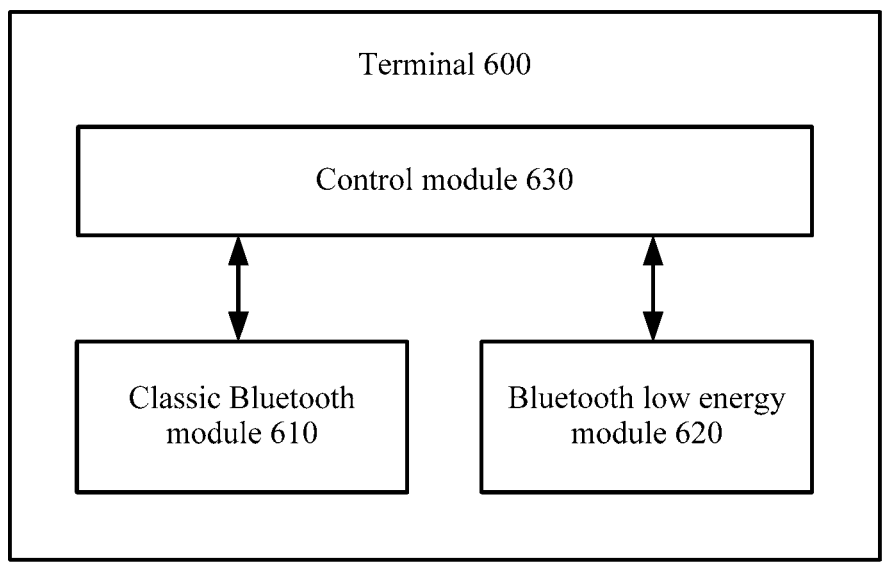
FIG. 6 is a schematic structural diagram of another terminal according to an embodiment of the present invention.

As shown in FIG. 6, an embodiment of the present invention further provides a schematic block diagram of a terminal, to implement the Bluetooth connection methods shown in FIG. 3 and FIG. 4, and the ciphertext generation and advertising method shown in FIG. 5. It can be understood that, for specific implementation details of executing the foregoing methods by the terminal shown in FIG. 6, refer to the related descriptions in FIG. 3 to FIG. 5. Details are not described herein again. Both the features and the technical effects in FIG. 3 to FIG. 6 are applicable to the terminal 600. It can be understood that, the terminal shown in FIG. 6 is applicable to a first terminal and a second terminal in a Bluetooth connection, that is, the mobile phone and the watch shown in FIG. 3 and FIG. 4.

The terminal 600 includes a Bluetooth low energy BLE module 610, a classic Bluetooth module 620, and a processing module 630.

The Bluetooth low energy module 610 may be configured to receive and send a BLE advertising message.

The classic Bluetooth module may be configured to: receive and send a classic Bluetooth connection request, and implement a classic Bluetooth connection to another terminal.

The processing module 630 may be configured to control the Bluetooth low energy module 610 and the classic Bluetooth module 620. Specifically, the processing module 630 may enable (enable) the Bluetooth low energy module 610 and/or the classic Bluetooth module 630 to send and receive an advertising message, a connection request, or the like. The processing module 630 may further obtain device information, for example, a Bluetooth address. Optionally, the processing module 630 may further generate a ciphertext and perform matching on the ciphertext.

Specifically, the terminal 600 is corresponding to the following second terminal. The second terminal may specifically include a Bluetooth low energy BLE module 610, a classic Bluetooth module 620, and a processing module 630.

The Bluetooth low energy module 610 may be configured to: after a classic Bluetooth connection between the second terminal and a first terminal is released, receive a BLE advertising message sent by the first terminal, and obtain device information from the BLE advertising message. Both the first terminal and the second terminal support Bluetooth low energy BLE and classic Bluetooth, and the BLE advertising message includes the device information.

The processing module 630 may be configured to match the device information with prestored device information.

The classic Bluetooth module 620 may be configured to: if the processing module 630 successfully matches the obtained device information with the prestored device information, initiate a classic Bluetooth connection request to the first terminal, to establish a classic Bluetooth connection to the first terminal.

Optionally, the processing module 630 may be further configured to: measure signal strength of the BLE advertising message, and determine that the measured signal strength is greater than a signal strength threshold preset by the second terminal.

It can be understood that the signal strength of the BLE advertising message may be measured by the Bluetooth low energy module 610.

Optionally, the processing module 630 may further generate a ciphertext and perform matching on the ciphertext. For specific details, refer to the description in the foregoing embodiment. Details are not described herein again.

Specifically, the terminal 600 is corresponding to the following first terminal. The first terminal may specifically include a Bluetooth low energy BLE module 610, a classic Bluetooth module 620, and a processing module 630.

The processing module 630 may be configured to obtain or generate device information.

The Bluetooth low energy module 610 may be configured to send a BLE advertising message after a classic Bluetooth connection between the first terminal and a second terminal is released. Both the first terminal and the second terminal support Bluetooth low energy BLE and classic Bluetooth, and the BLE advertising message includes device information, so that the second terminal performs matching on the device information after receiving the BLE advertising message, and initiates a classic Bluetooth connection after the matching succeeds.

The classic Bluetooth module 620 may be in a classic Bluetooth connectable state, and receives a Bluetooth connection request of the second terminal.

The classic Bluetooth module 620 may be further configured to establish a classic Bluetooth connection to the second terminal after receiving the Bluetooth connection request of the second terminal.

Optionally, the processing module 630 may further generate a ciphertext and perform matching on the ciphertext. For specific details, refer to the description in the foregoing embodiment. Details are not described herein again.

The terminal 600 may implement a real-time classic Bluetooth automatic reconnection in a low energy state.

A person of ordinary skill in the art may understand that all or some of the steps of the foregoing methods in the embodiments of the present invention may be implemented by a program instructing relevant hardware. The program may be stored in a computer-readable storage medium. The storage medium includes a ROM, a RAM, an optical disc, and the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A Bluetooth connection method, comprising:
   after a classic Bluetooth connection between a first terminal and a second terminal is released, sending, by the first terminal, a Bluetooth low energy (BLE) advertising message, wherein both the first terminal and the second terminal support BLE and classic Bluetooth, and the BLE advertising message comprises device information;
   receiving, by the second terminal, the BLE advertising message, and obtaining the device information;
   matching, by the second terminal, the device information with prestored device information;
   if the device information obtained by the second terminal successfully matches the prestored device information, initiating, by the second terminal, a classic Bluetooth connection request to the first terminal; and
   establishing, by the first terminal, a classic Bluetooth connection to the second terminal; and wherein
   the device information is a first ciphertext generated by the first terminal; and
   matching, by the second terminal, the device information with prestored device information comprises: matching, by the second terminal, the obtained first ciphertext generated by the first terminal with a prestored second ciphertext generated by the second terminal, wherein the first terminal and the second terminal obtain a same public attribute and same status data of the classic Bluetooth connection, and generate the first ciphertext and the second ciphertext by encrypting the public attribute and the status data using a same encryption algorithm.

2. The method according to claim 1, wherein before the initiating, by the second terminal, a classic Bluetooth connection request to the first terminal, the method further comprises:
   measuring, by the second terminal, signal strength of the BLE advertising message, and determining that the measured signal strength is greater than a signal strength threshold preset by the second terminal.

3. The method according to claim 1, wherein the public attribute and the status data comprise: a connectable address of a current connection, a release time point of a previous Bluetooth connection or a time period since previous Bluetooth is disconnected, a value transferred in a previous Bluetooth connection, a value transferred by using an advertising message before a previous Bluetooth connection is released, or a link key used in a previous successful classic Bluetooth connection.

4. The method according to claim 1, wherein the first terminal periodically updates the first ciphertext, and the second terminal periodically updates the second ciphertext.

5. A terminal that supports Bluetooth low energy (BLE) and classic Bluetooth, comprising: one or more processors, a memory;
   the memory is configured to store an instruction; and
   the one or more processors are configured to invoke the instruction in the memory to cause the terminal to perform:
   after a classic Bluetooth connection between a first terminal and a second terminal is released, receiving a BLE advertising message sent by a first terminal, and obtaining device information from the BLE advertising message;
   matching the device information with prestored device information; and
   if the obtained device information successfully matches the prestored device information, initiating a classic Bluetooth connection request to the first terminal, to establish a classic Bluetooth connection to the first terminal; and, wherein
   the device information is a first cipher text generated by the first terminal by encrypting a public attribute and a status data of the classic Bluetooth connection using an encryption algorithm; and,
   before receiving, by the second terminal, the BLE advertising message sent by the first terminal, the method further comprises:
   obtaining of the public attribute and the status data of the classic Bluetooth connection encrypted by the first device;
   generating, by the second terminal, a second cipher text by encrypting the public attribute and the status data of the classic Bluetooth connection using the same encryption algorithm; and
   storing the second cipher text and
   matching, by the second terminal, the device information with prestored device information comprises: matching, by the second terminal, the obtained first cipher text with the prestored second cipher text.

6. The terminal according to claim 5, wherein before the initiating a classic Bluetooth connection request to the first terminal, the one or more processors are further configured to:
   measure signal strength of the BLE advertising message, and determine that the measured signal strength is greater than a preset signal strength threshold.

7. The terminal according to claim 5, wherein the public attribute and the status data comprise one or more of the following: a connectable address of a current connection, a release time point of a previous Bluetooth connection or a time period since previous Bluetooth is disconnected, a value transferred in a previous Bluetooth connection, a value transferred by using an advertising message before a previous Bluetooth connection is released, or a link key used in a previous successful classic Bluetooth connection.

* * * * *